United States Patent [19]

Nakamura et al.

[11] Patent Number: 5,576,860
[45] Date of Patent: Nov. 19, 1996

[54] LIQUID CRYSTAL DISPLAY DEVICE IN WHICH THE HEIGHTS OF THE REFLECTION PLATE PROJECTIONS ARE LESS THAN HALF THE THICKNESSES OF THE TWO ALIGNING FILMS TOGETHER

[75] Inventors: Kozo Nakamura, Kashiba; Seiichi Mitsui; Naofumi Kimura, both of Nara, all of Japan

[73] Assignee: Sharp Kabushiki Kaisha, Osaka, Japan

[21] Appl. No.: 111,147

[22] Filed: Aug. 17, 1993

[30] Foreign Application Priority Data

Aug. 19, 1992 [JP] Japan .................................. 4-220438

[51] Int. Cl.$^6$ ........................ G02F 1/1335; G02F 1/1337; G02F 1/13; C09K 19/60
[52] U.S. Cl. .................................. 359/70; 359/77; 359/98; 359/102
[58] Field of Search ........................ 359/77, 70, 87, 359/98, 102, 59

[56] References Cited

U.S. PATENT DOCUMENTS

| | | | |
|---|---|---|---|
| 3,846,014 | 11/1974 | Aldrich et al. | 359/70 |
| 4,519,678 | 5/1985 | Komatsubara et al. | 359/70 |
| 5,204,765 | 4/1993 | Mitsui et al. | 359/70 |
| 5,408,345 | 4/1995 | Mitsui et al. | 359/59 |

FOREIGN PATENT DOCUMENTS

| | | | |
|---|---|---|---|
| 5-173158 | 7/1993 | Japan | 359/70 |
| 2020841 | 11/1979 | United Kingdom . | |

OTHER PUBLICATIONS

T. Koizumi, et al., "Reflective Multicolor LCD (II): Improvement In The Brightness", *Proceedings of the SID*, vol. 29/2, 1988, pp. 157–160.

D. White, et al., "New absorptive mode reflective liquid-crystal display device", *Journal of Appl. Physics*, vol. 45, No. 11, Nov. 1974, pp. 4718–4723.

Uchida, et al., *Proceedings of the Society for Information Display (SID)*, 27(3):223–227 (1986).

Koizumi, et al., *Proceedings of the Society for Information Display (SID)*, 29(2):157–160(1988).

*Primary Examiner*—Anita Pellman Gross
*Assistant Examiner*—Walter J. Malinowski
*Attorney, Agent, or Firm*—David G. Conlin; George W. Neuner

[57] ABSTRACT

A liquid crystal display device is disclosed. The display device uses a phase transition type guest-host mode. The device is made with a pair of substrates (31, 45). One substrate is a transparent substrate and having a transparent electrode (47) and an aligning film (48) formed in this order. The other substrate is located opposite to the transparent substrate and has an insulating film (34), a reflection plate (38), and an aligning film (44) formed in this order. The reflection plate has projections (42*a,b*) at the surface. The aligning films are subjected to a vertical aligning treatment relative to the respective substrates. A liquid crystal composition is disposed between the aligning films, and has a nematic liquid crystal, a chiral additive and a two-tone pigment. A helical pitch ($P_o$) of the liquid crystal composition and the cell thickness (d) of the liquid crystal display device satisfy the relation of $1.5 < d/P_o \geq 4$.

7 Claims, 7 Drawing Sheets ds : Surface layer
d₁ : Step of projection
$d_1 < \dfrac{ds}{2}$

Model view in the present invention

Model view in the present invention

For manufacturing a reflection plate

LIQUID CRYSTAL DISPLAY DEVICE IN WHICH THE HEIGHTS OF THE REFLECTION PLATE PROJECTIONS ARE LESS THAN HALF THE THICKNESSES OF THE TWO ALIGNING FILMS TOGETHER

BACKGROUND OF THE INVENTION

1. Field of the Invention

The present invention relates to a liquid crystal display device using the guest-host mode.

2. Description of the Related Art

Recently, a rapid progress has been made in the application of liquid crystal display devices to word processors, laptop personal computers, and pocket TV sets. In particular, liquid crystal display devices of reflection type, which work with reflection of incident light, do not require a back light, thereby consuming a smaller amount of power and requiring less thickness and weight. Thus they attract attention from many people.

Conventionally, liquid crystal display devices of reflection type use the TN (twisted nematic) mode or the STN (super twisted nematic) mode. These modes involves mounting a linear polarizer therein to shield an incident light. As a consequence, it naturally follows that a half of the intensity of incident light is not used in the display, which darkens the displayed image. To overcome such a drawback, a display mode for effectively using all the incident light has been proposed. Examples of such mode include the phase transition type guest-host mode (D. L. White and G. N. Taylor: J. Appl. Phys. 45, 4718, 1974). This mode uses the cholesteric-nematic phase transition phenomenon caused by an electric field. Into a liquid crystal cell subjected to a vertical aligning treatment is disposed a liquid crystal composition; comprising a cholesteric liquid crystal and a two-tone pigment, a cholesteric liquid crystal being obtained by adding a chiral material into a nematic liquid crystal having a positive dielectric anisotropy.

Even when a voltage is not applied, the liquid crystal composition forms a helix in accordance with the amount of added chiral materials. Consequently, the two-tone pigment absorbs light passing through the liquid crystal device, which develops a color. In the next step, application of a voltage more than the threshold value provides a homeotropic orientation, which allows light passing through the liquid crystal display device to develop no color without being absorbed by the two-tone pigment. In addition to this mode, a multi-tone display of reflection type is also proposed by combining a micro color filter(Proceedings of SID Vol. 29 157 1988).

By the way, liquid crystal display devices of reflection type, particularly color liquid crystal display devices of the same type having a reflection plate carried on the outside of the cell produce a parallax because of the glass thickness of the reflection plate, as while producing a shadow and an insufficient mixture of colors. This problem is settled by forming within the cell a reflection plate which also serves as a pixel electrode. Such pixel electrode controls a reflected light with the irregular patterns formed on the surface.

However, rendering uniform the orientation in the liquid crystal cell is extremely difficult. The display mode described in the above documents produces an irregular helix when the step of the recess formed in the reflection plate is larger than the thickness of the surface layer; hence such display mode produces an irregular display. Furthermore, with respect to liquid crystal display devices using a liquid crystal composition having a small ratio of $d/P_0$ where $P_0$ represents a helical pitch of the liquid crystal composition, and d a cell thickness of the devices, the reduced light absorption by the pigment at the application of no voltage results in a low contrast ratio although applying the low threshold voltage. Besides, when $d/P_0$ is large, light absorption by the pigment at the application of no voltage increases to offer a high contrast. On the other hand, the threshold value increases, which is not suitable for a low-voltage drive.

SUMMARY OF THE INVENTION

Therefore, the present invention provides a liquid crystal display device which uses a phase transition type guest-host mode, the device comprising:

a pair of transparent substrates at least one having a reflection plate and an aligning film formed in this order, the reflection plate having a transparent electrode and irregular patterns formed thereon, the other transparent substrate located opposite to the former transparent substrate having a transparent electrode and an aligning film located opposite to the former transparent electrode and the former aligning film, the aligning films subjected to a vertical aligning treatment relative to the respective substrates; and a liquid crystal composition being disposed between the aligning film and the aligning film opposite thereto, and comprising a nematic liquid crystal, a chiral additive and a two-tone pigment;

wherein a helical pitch($P_0$) of the liquid crystal composition and the cell thickness(d) of the liquid crystal display device satisfy the relation of $1.5<d/P_0<4$.

In the above description, the helical pitch ($P_0$) of the liquid crystal composition is defined as a length across the molecular axis of the helical liquid crystal molecule when the molecule makes one revolution on the axis thereof.

Preferably, the present invention provides a liquid crystal display device which satisfies the relation of $d_1<d_s/2$ where $d_1$ represents the height of the projection of the reflection plate and $d_s$ represents the thickness of the two aligning film subjected to an aligning treatment added together.

BRIEF DESCRIPTION OF THE DRAWINGS

The present invention will be detailed in conjunction with the accompanying drawings in which.

DETAILED DESCRIPTION OF THE INVENTION

The object of the present invention is to provide a liquid crystal display device free from irregularities in the display, the device having a high contrast ratio and enabling a low-voltage operation.

The liquid crystal composition of the present invention comprises a two-tone pigment of the quest-host and a chiral-smectic liquid crystal.

The chiral-nematic liquid crystal composition which forms a host composition of the present invention is manufactured by adding a chiral material to the following known nematic liquid crystal. Known nematic liquid crystals include many kinds of compounds and mixtures such as Schiff compounds, azoxy compounds, biphenyl compounds, phenyl-ester compounds, phenylcyclohexane compounds and pyridine compounds. In addition, chiral materials include S-811 (manufactured by Merck & Co.), CB-11 (manufactured by BDH Corporation), and CM (manufactured by Chisso Co., Ltd.). Chiral materials can control the helical pitch ($P_o$) in accordance with the amount added to the nematic liquid crystal composition.

Here, two-tone pigment compounds exhibiting magenta include G214 and, G241, the counterparts exhibiting green color include a mixture of G282 and G232, the counterparts exhibiting cyan include G282 and G279 and the counterparts exhibiting blue color include G274 and G277 (all manufactured by Japan Photosensitive Pigment Laboratory).

Guest-host liquid crystal compositions containing black pigment include ZLI-2267, ZLI-4756/1, ZLI-3521/1, ZLI-4714, ZLI-4113, ZLI-3402/1 (all manufactured by Merck & Co.).

Thus a guest compound is added to each kind of host (chiral-nematic) liquid crystal material to form a liquid crystal composition with the result that a liquid crystal display device of the present invention is constituted.

A liquid crystal display device of the present invention includes a substrate having a surface on which liquid crystal molecules exhibit an orientation perpendicular to the substrate. In other words, the aligning on the substrate can be provided by the vertical aligning of the aligning film coating the aligning film on the substrate.

Figure 5:
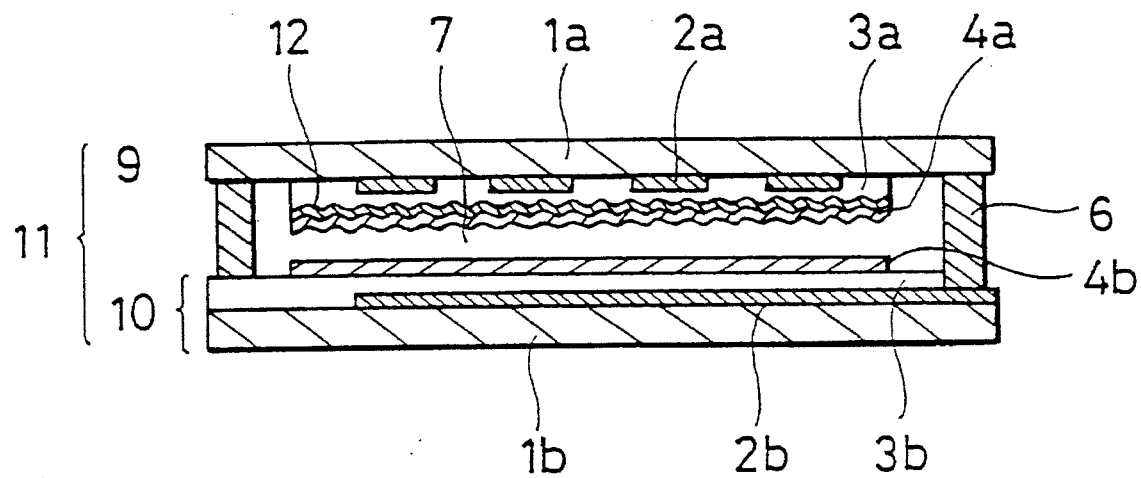
FIG. 5 is a model view showing a liquid crystal display device.

An example of the liquid crystal display device of the present invention is shown in FIG. 5, illustrating the construction of the liquid crystal display device according to the present invention. In the construction, the insulating film may be omitted, but the example of the liquid crystal display device will be detailed in the case where the insulating film is mounted.

A substrate 9 can be formed by laminating a transparent electrode 2a, an insulating film 3a, a reflection plate 12 and an aligning film 4a in this order on a glass substrate 1a, which serves as one of the transparent substrates. Here, the transparent electrode 2a is formed by a plurality of transparent electrodes arranged in a strip-like configuration so that they extend parallel to each other. The aligning film 4a is provided with a vertical aligning treatment.

A substrate 10 is formed by laminating a transparent electrode 2b, an insulating film 3b, and an aligning film 4b in this order on a glass substrate 1b located opposite to the glass substrate 1a in the same condition. Like the substrate 9, the transparent electrode 2b is formed by a plurality of transparent electrodes arranged in a strip-like configuration so that they extend parallel to each other. The aligning film 4b is provided with a vertical aligning treatment.

As a transparent electrode of the present invention, an insulating film pervious to light is used; a glass substrate is usually used. Moreover, the transparent electrode is formed of a conductive thin film such as $InO_3$, $SnO_3$, ITO (Indium Tin Oxide).

As the insulating film, an inorganic thin film such as $SiO_2$, $SiN_x$, and $Al_2O_3$, and an organic thin film such as polyimide, photoresist resin and polymer liquid crystal can be used. When the insulating film is made of inorganic material, it can be formed with such methods as the vapor deposition process, the sputtering process, the CVD process, and the solution coating process. When the insulating film is formed of an organic material, a solution formed by dissolving an organic material or a precursor is used to coat the film with the spinner coating process, the dip coating process, the screen printing process, and the roll coating process. Besides, the insulating film can be formed by the process that cures the film in a certain curing conditions (heating the film or irradiating the film with light). Or the insulating film can be formed by the vapor deposition process, the sputtering process, the CVD process and the LB (Langumuir Blodgett) process.

In the next step, a reflection plate is formed on the insulating film. The reflection plate is usually formed by applying a metal composition on a generally polyimide or acrylic resin-made transparent surface having projections formed thereon. As the metal composition for the reflection plate, such metals as aluminum, nickel, chromium, tin and silver are preferable. The metal composition is patterned into a predetermined configuration with the vapor deposition process or the like. The metal composition has a thickness of 0.01 to 0.1 µm. The projection thus formed has a height ($d_1$) of about 0.2 to 3 µm.

On the reflection plate and the other insulating film is formed an aligning film. The aligning film uses either an inorganic or an organic layer depending on the case. Inorganic aligning films include silicon oxide or the like. On the other hand, as an organic aligning film, such materials as nylon, polyvinyl alcohol, polyimide or the like can be used. As a method for vertical aligning, generally employed is a method that allows vertical arrangement of liquid crystal molecules by coating silane coupling agent, polycyclohexane, and chromium complex on the substrate. In these cases, liquid crystal molecules are vertically arranged by the mutual action of the alkyl group and the end group of the liquid crystal molecules. In particular, when alkyl group has 14 to 18 carbon atoms, the force that vertically arranges liquid crystal molecules is the strongest. In addition, an aligning using polymer liquid crystals and LB film, an aligning by the magnetic field, and by the spacer edge process are also possible. Furthermore, a method that allows vapor deposition of $SiO_2$ and $SiN_x$ is also possible.

The above aligning treatment forms a surface layer as an aligning treatment layer.

In addition, the substrates 9 and 10 are laminated to each other in such a manner that the aligning films 4a, 4b are disposed opposite to each other, and a liquid crystal composition 7 is disposed between the aligning films and sealed by a sealant 6. In such manner is manufactured a liquid crystal cell 11 having the liquid crystal composition 7 disposed between the substrate 9 and 10.

Here, it is between the two aligning films, upper and lower, that the liquid crystal composition 7 is disposed. The thickness (d) of the cell depends on the design and the construction of the liquid crystal display device. The thickness(d) is in the range of about 1.0 and 20.0 µm, but preferably 5.0 to 8.0 µm.

Measuring the contrast of this display device surprisingly shows that only the device that satisfies the following conditions has a high contrast, thereby allowing a bright display.

In other words, the device satisfies a condition represented by the following equation;

$$1.5<d/P_0<4 \text{ or } d_1<d_s/2$$

where $P_0$ represents the helical pitch of the liquid crystal composition, d a cell thickness of the liquid crystal display device, $d_1$ height of the projections on the reflection plate, $d_s$ a depth of the surface layer formed by adding the thickness of the upper and lower aligning films provided with aligning treatment.

The helical pitch($P_0$), the height($d_1$) of the projection and the depth($d_s$) of the surface layer are preferably in the ranges of 0.25 to 13.33 μm, 0.05 to 3.0 μm, and 0.1 to 5.33 μm, respectively.

EXAMPLE

Example 1

Figure 1:
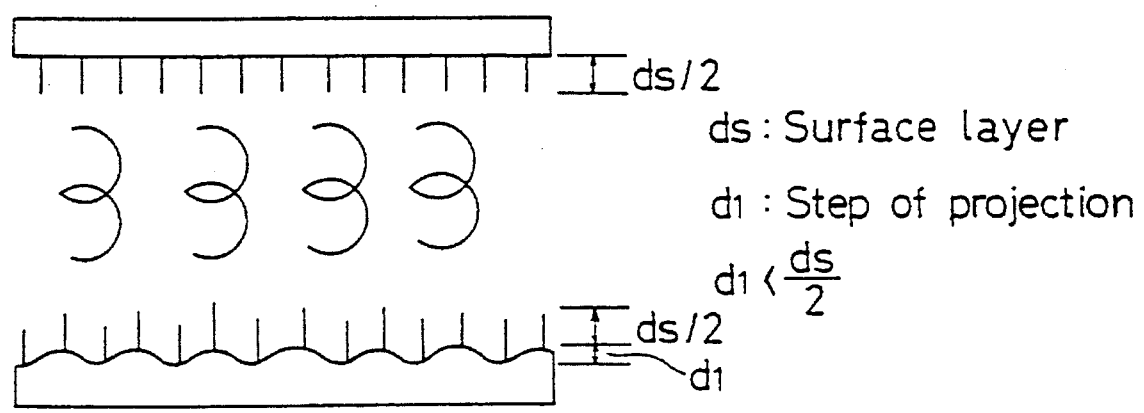
FIG. 1 is a view showing a model of the present invention.

FIG. 1 is a model view of a liquid crystal display device of the present invention.

To ZLI-2327 (manufactured by Merck & Co.) in which a black pigment was mixed to a nematic liquid crystal having a positive dielectric anisotropy, a predetermined amount of optically active S-811 (manufactured by Merck & Co.) was mixed so that $d/P_0$=1.0, 1.7, 2.2, 3.0 was provided to form a liquid crystal composition.

On one of the two substrates each having a transparent electrode formed thereon, a recess was formed to satisfy a relation of $d_1<d_s/2$ and $d_1$ was fixed at 0.5 μm. The two substrates were then subjected to a vertical aligning treatment to form a liquid crystal cell having a cell thickness(d) of 7.7 μm. Into the cell thickness was disposed the above liquid crystal composition. $P_0$ was 7.7, 4.5, 3.5 and 2.6 μm, respectively.

In the wedge-shaped cell provided with a vertical aligning on the surface thereof, a chiral-nematic liquid crystal was injected. Here the thickness $d_s$ of the surface layer was determined by measuring the thickness of the cell thickness on the boundary between a region having a helical movement of liquid crystal molecules and a region having a vertical aligning thereof. It was generally represented by the following formula as a function of $P_0$:

$$d_s=0.4P_0$$

As a result, $d_s$ was 3.1, 1.8, 1.4, and 1.04, respectively.

Figure 2:
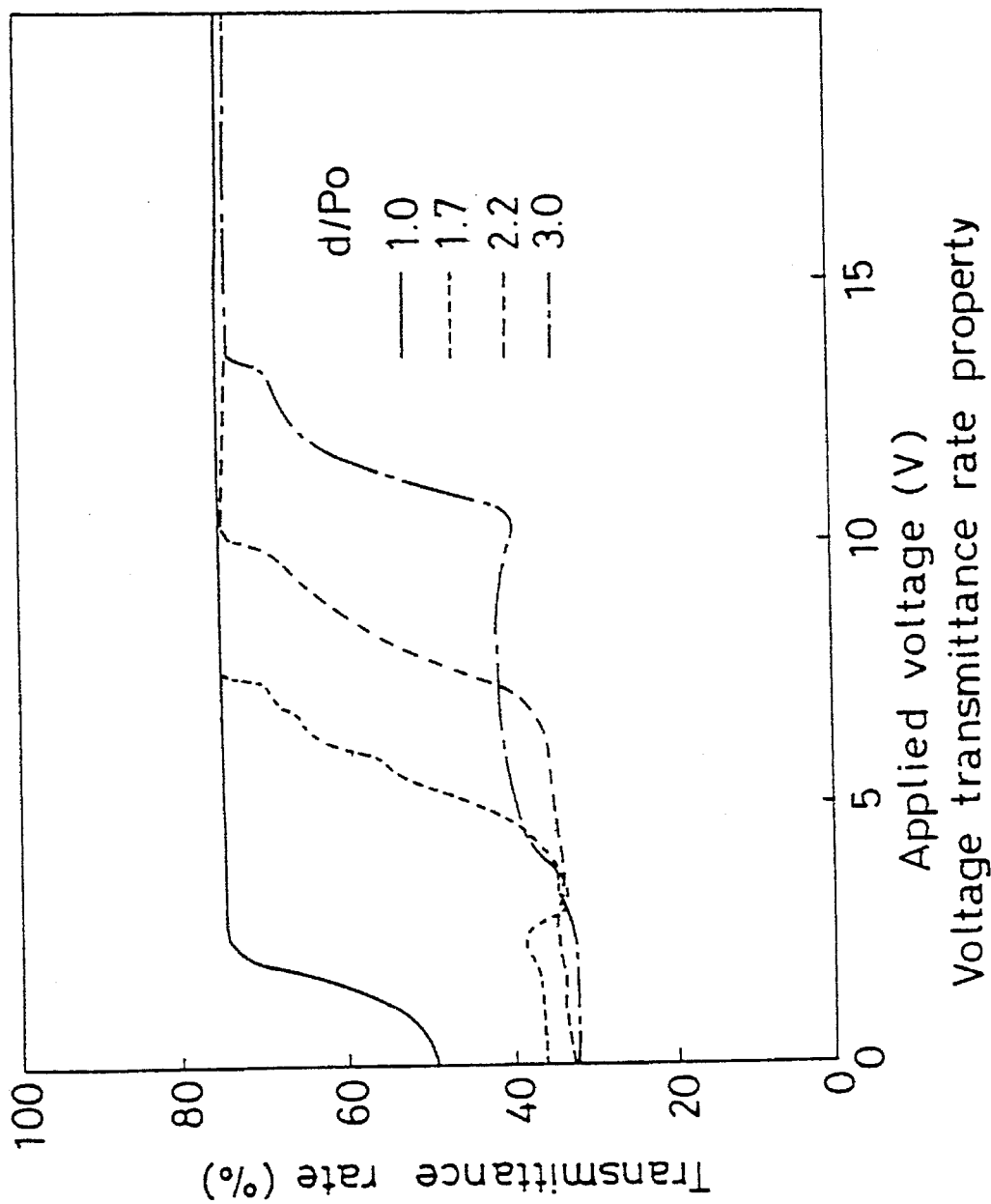
FIG. 2 is a view showing a voltage to transmittance rate properties relation when $d/P_0$ assumes (1.0, 1.7, 2.2, 3.0)
Figure 3:
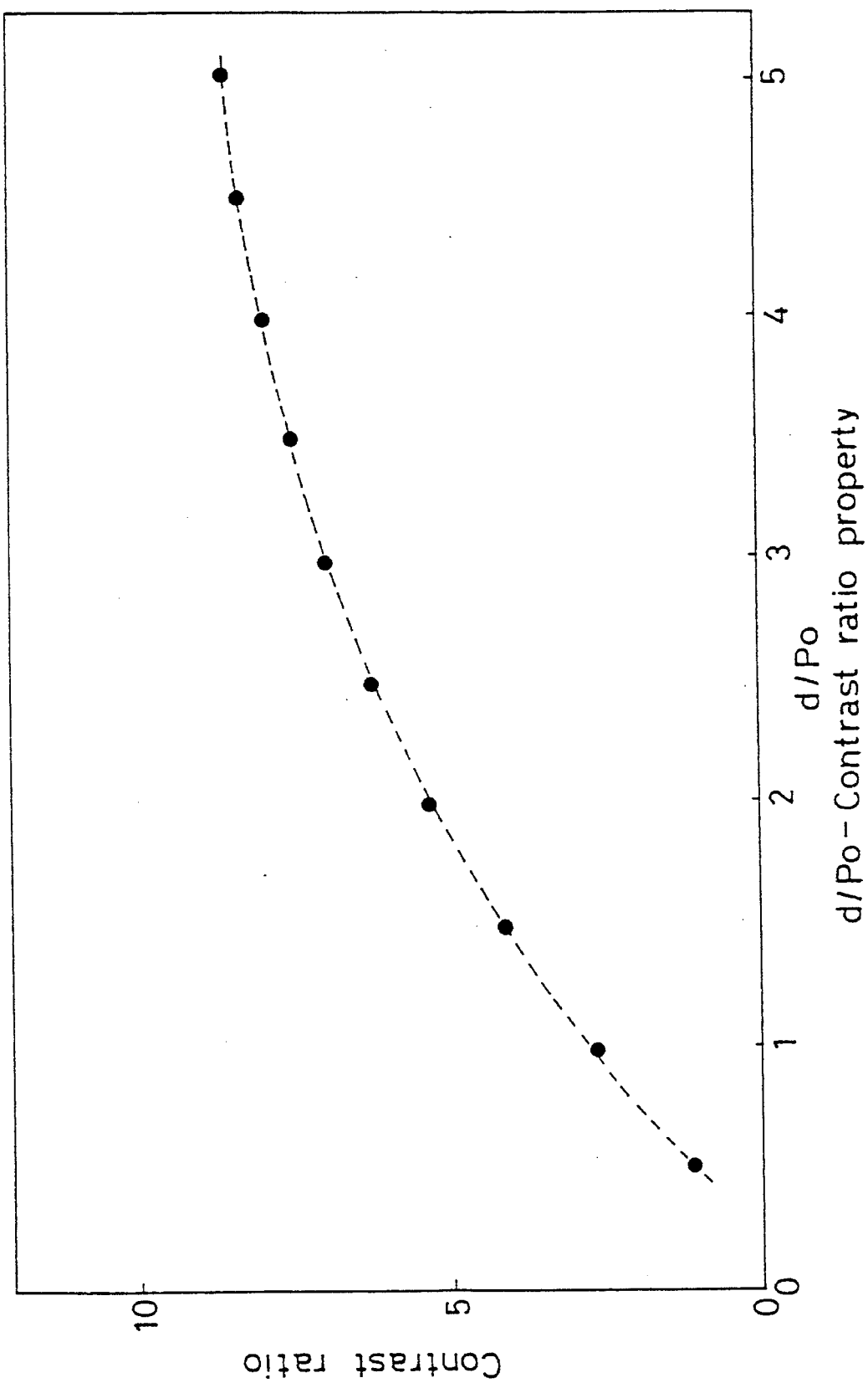
FIG. 3 is a view showing relations between $d/P_0$ and contrast ratio properties.
Figure 4A:
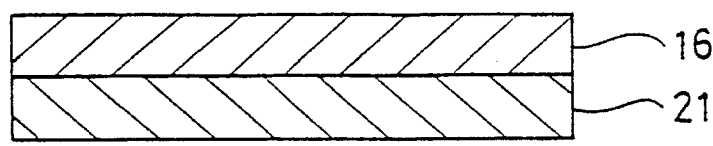
FIG. 4(a)–FIG. 4(g) illustrate steps in a method for manufacturing a reflection plate.
Figure 4B:
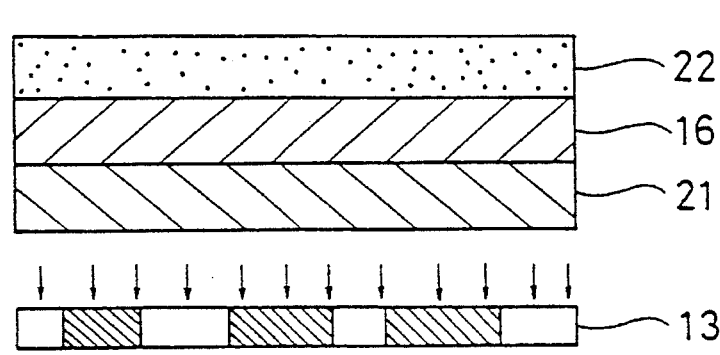
Figure 4C:
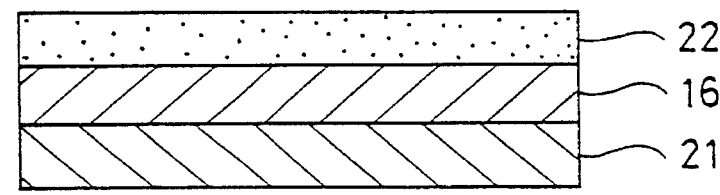
Figure 4D:
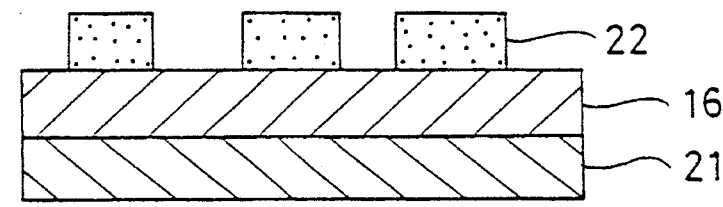
Figure 4E:
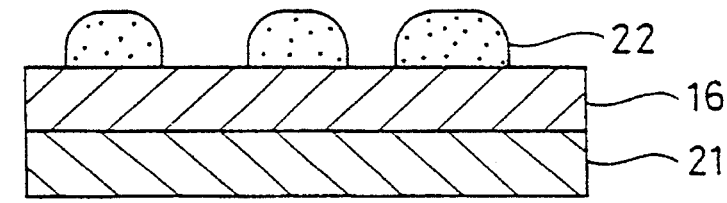
Figure 4F:
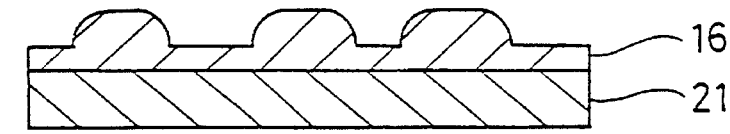
Figure 4G:
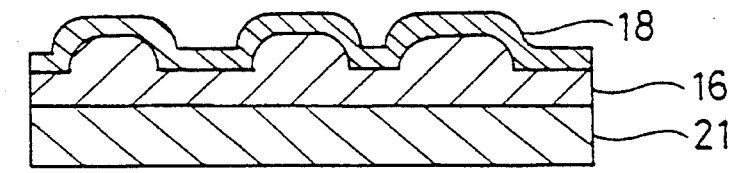

In the next step, a variation in the rate of transmittance was examined by applying a voltage to the liquid crystal display device. FIG. 2 shows the result of the examination. In addition, an influence on the contrast ratio of the $d/P_0$ was shown in FIG. 3. The relation of $d/P_0$=1.0 designated that the contrast ratio fell because the rate of transmittance was high at the application of no voltage though the threshold voltage was low. On the other hand, when the relation change is large, the contrast ratio rose as a result of reducing the rate of transmittance at the application of no voltage, and the threshold voltage became high. In addition, the contrast ratio exhibited a saturated tendency of the order of $d/P_0$=4. Consequently, the device could be driven at a low voltage at which it could exhibit a high contrast ratio in a region which satisfied $1.5<d/P_0<4$.

Example 2

FIG. 4 shows a manufacturing process of a reflection plate used in a liquid crystal display device of reflection type. On one surface of a glass 21 having a thickness of 1 mm (product name: 7059 by Owens-Corning Fiberglass Co.) the organic insulating film 16 was formed at a thickness of 1.7 μm by spincoating polyimide resin at a rate of 1200 r.p.m., for 20 sec. shown in FIG. 4(a). On the organic insulating film was applied a resist 22 shown in FIG. 4(b). Patterning and dry etching shown in FIG. 4(c), (d) were provided by using a predetermined mask 13 to form a projection on the organic insulating film shown in FIG. 4(f). In addition, after forming the projection, an organic insulating film might be applied to provide a smooth surface. Furthermore, a thin metal film 18 was formed on the organic insulating film 16 which had been formed as shown in FIG. 4(g). Materials for thin metal film included Al, Ni, Cr and Ag. The thickness of the thin metal film suitably was in the range of about 0.01 and 1.0 μm. In this particular example, Al was subjected to a vacuum evaporation to form a thin metal film. By such process, a reflection plate 18 was produced. A liquid crystal display device of reflection type with a condition of $d/P_0$=2.2 was manufactured by using the above-mentioned reflection plate 18. The contrast ratio showed 7. Applying a driving voltage of 12 V provided favorable display properties. Besides, it had been confirmed that favorable display properties such as a contrast ratio of 4 or more and a driving voltage of 15 V or less could be obtained in a region having a relation of $1.5<P_0<4$.

Example 3

Figure 6:
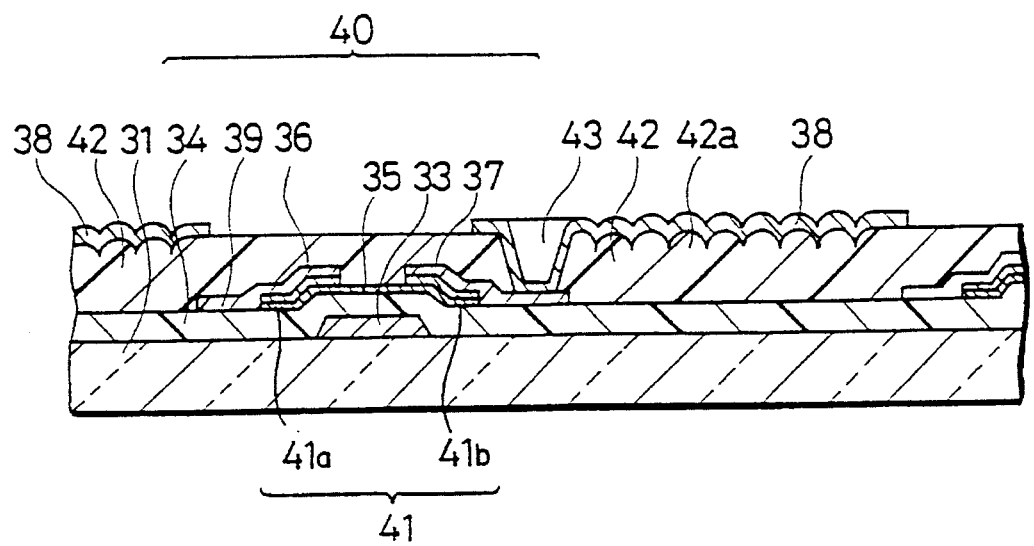
FIG. 6 is a partial sectional view showing an active matrix substrate of the reflection type for use in a liquid crystal display device of the reflection type according to the present invention.

FIG. 6 is a partial sectional view of an active matrix substrate of reflection type for use in a liquid crystal display device of reflection type according to the present invention.

The active matrix substrate of the present invention had a glass insulating substrate 31 and a TFT (thin film transistor) 40 formed on the substrate to serve as a switching device. The source electrode 36 served as an input terminal of the TFT 40. A source bus wiring 39 was connected to the source electrode 36. The organic insulating film 42 coated the TFT 40 and the source bus wiring 39 to be formed on the entire surface of the substrate 31. A projection 42a with a uniform height was formed on the surface of an organic insulating film 42 having a circular and donut-like configuration and serving as a reflection plate 38 with the photolithographic process or the dry etching process in a random arrangement. A contact hole 43 was formed in part of the organic insulating film 42 located on a drain electrode 37 serving as an output terminal of the TFT 40. The reflection plate 38 was formed only on the projection 42a on the organic insulating film 42 and was connected to the drain electrode 37 of the TFT 40 via a contact hole 43. On the other hand, the reflection plate 38 was formed in such a manner that it overlapped a part of the gate bus wiring and a part of the source bus wiring. The reflection plate 38 could be used as the function of a pixel electrode. With the construction mentioned above, the repeller 38, the gate bus wiring and the source bus wiring were formed so that they overlapped each other, thus no space was provided between the reflection plate 38, the gate bus wiring and the source bus wiring. Thus, such construction had an advantage that the area of the reflection plate 38 could be enlarged. Enlarging the area of the reflection plate 38 enlarged the pixel opening ratio, which allowed a bright display. When an insulation failed at a portion where the reflection plate 38, the gate bus wiring and the source bus wiring overlapped, the insulation failure could be settled by turning the overlapped portion into a projecting configuration.

Figure 7:
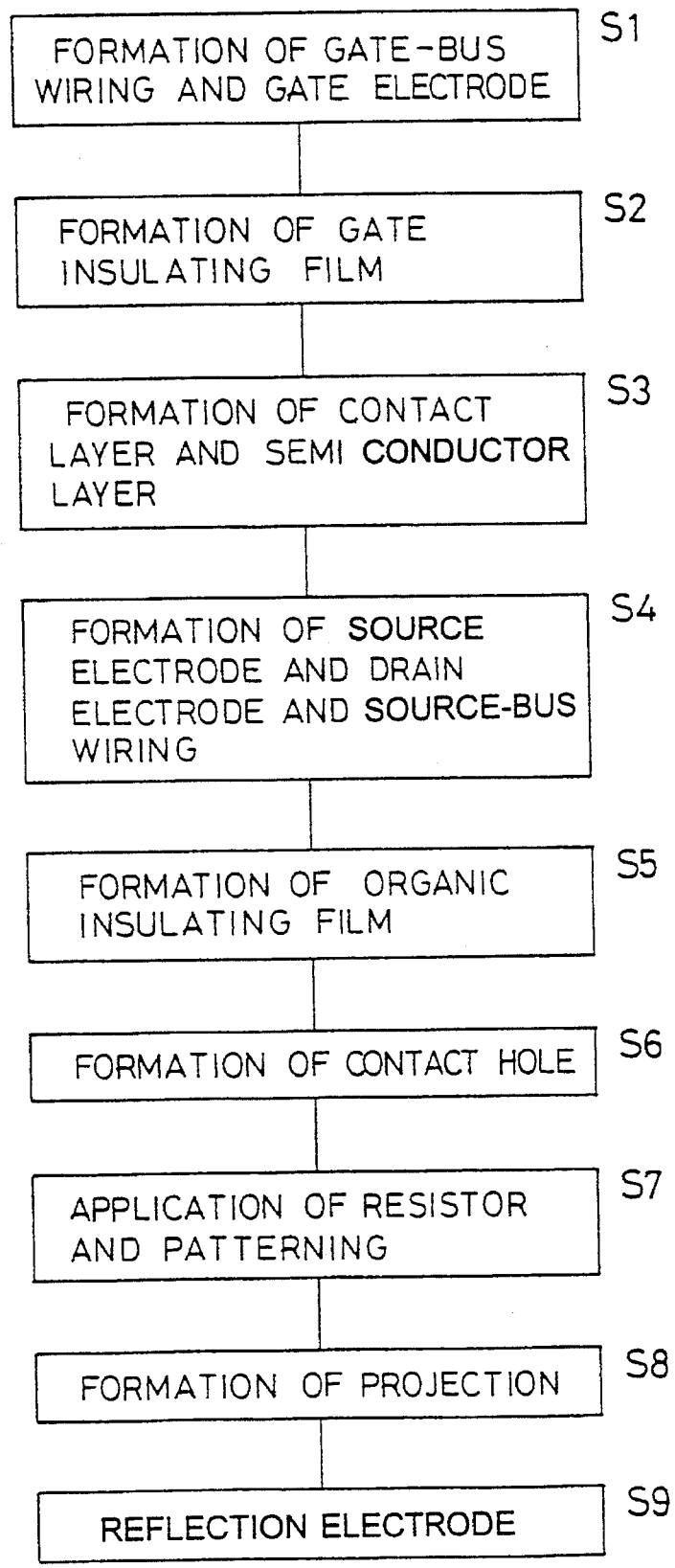
FIG. 7 is a view showing a process for manufacturing the active matrix substrate of the reflection type.

FIG. 7 shows the steps of a manufacturing process of an active matrix substrate shown in FIG. 6. A Ta metal layer with a thickness of 3000 Å was formed on an insulating glass substrate 31 with the sputtering process and then a gate bus wiring and the gate electrode 33 were formed by patterning the Ta metal layer with the photolithographic process and etching process (Step 1). In the next step, a gate insulating film formed of SiNx with a thickness of 4000 Å and a semiconductor layer were sequentially formed in this order with the plasma CVD process (Step 2). In the next step, an active layer 35 consisting of the contact layer and the semiconductor layer were formed by patterning an $N^+$-doped amorphous silicon layer and an amorphous silicon layer (Step 3). Then a Mo metal with a thickness of 2000 Å was formed to make a source/drain region 41 on the entire surface of the substrate with the sputtering process, and then the source electrode 36, the drain electrode 37 and the source bus wiring were formed by patterning the Mo metal layer (Step 4). In the above process, the TFT 40 was formed to form source region 41a and drain region 41b.

A polyimide resin with a thickness of 1700 Å was spread on the entire surface of the substrate, which was further patterned to form an organic insulating film (Step 5). Then an organic insulating film 42 was formed and a contact hole 43 was formed on the organic insulating film 42 with the photolithographic and dry etching process (Step 6). The organic insulating film 42 was patterned into a circular and a donut-like configuration arranged at random with the photolithographic and dry etching process (Step 7). A smooth projection 42a,b was formed with the thermal annealing process (Step 8). Then Al film was formed on the entire surface of the organic insulating film 42, which was patterned to form a reflection plate 38 (Step 9).

The reflection plate 38 was connected to the drain electrode 37 of the TFT 40 via the contact hole 43 formed on the organic insulating film 42. The shape of the projection on the organic insulating film could be controlled by the shape of the mask, the thickness of the resist, and the thickness of the organic insulating film.

In the above process, an active matrix substrate 50 of reflection type could be manufactured.

Figure 8:
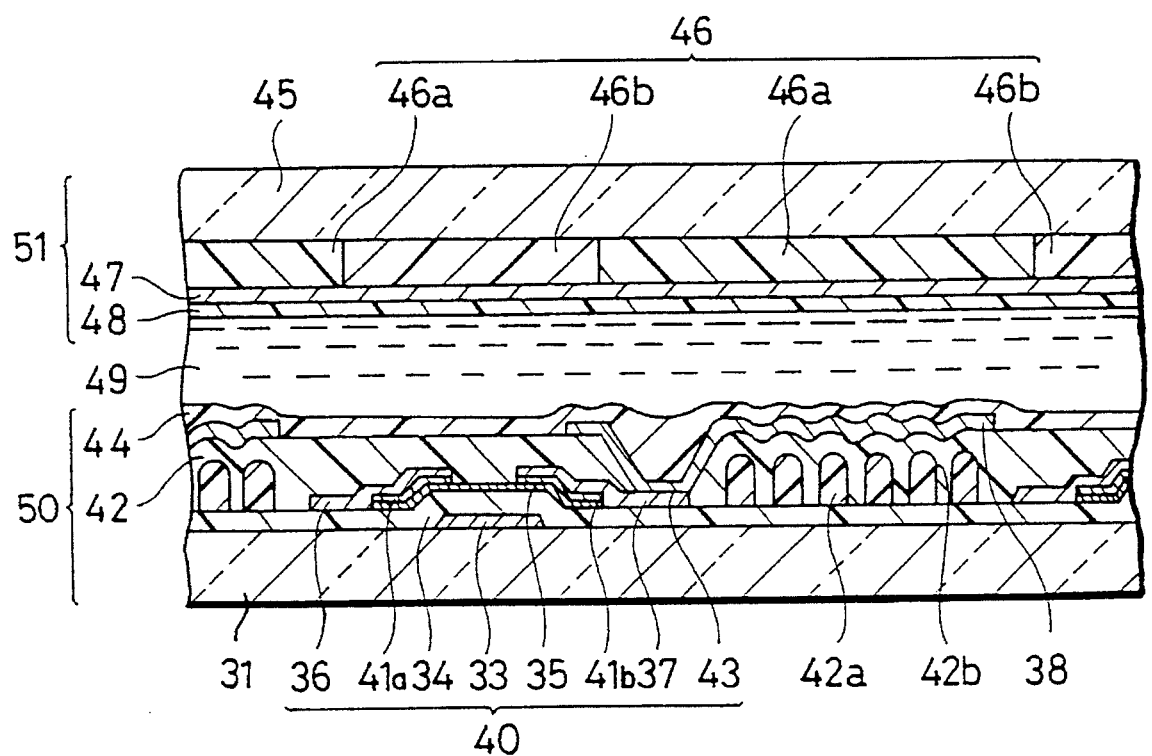
FIG. 8 is a sectional view showing a color liquid crystal display device of the reflection type manufactured by using an active matrix substrate of the reflection type.

FIG. 8 shows a sectional view of a color liquid crystal display device of reflection type manufactured by using an active matrix substrate 50 of reflection type.

On the entire surface of complementary color filters 46a, 46b (magenta and green), an ITO film 47 was formed to a thickness of 1000 Å. The active matrix substrate 50 of reflection type, and the ITO film 47 on the complementary color filter substrate 51 (magenta-green) formed on substrate 45 were each coated with a liquid crystal aligning film (44, 48) on the each surface thereof and then sintered. Between these substrates, a sealing layer (not shown) having a spacer with a 7 μm diameter mixed into an adhesive sealing agent was formed with the screen printing method. After the sealing layer was formed, a liquid crystal composition 49 was disposed after vacuum degassing. This particular example was used a liquid crystal composition prepared by mixing 4.5 wt % ($d/P_0=2.2$) of a chiral material (manufactured by Merck & Co.; trade name S811) with a guest-host liquid crystal (manufactured by Merck & Co.; trade name ZLI2327) having a black pigment mixed therein.

This particular example of the liquid crystal display device using an active matrix substrate provided a uniform orientation and a display with a favorable contrast of 8.

This example disclosed a liquid crystal display device using glass as an insulating substrate. Even opaque insulating substrates like the Si substrate exhibited the same effect. Furthermore, this latter case had an advantage that a circuit could be formed on the substrate.

Incidentally, the above example disclosed a device using a TFT as a switching device thereof. However, the same thing held true of an active matrix substrate using metal-insulation-metal (MIM) devices, diodes, transistors, and the like.

As mentioned above, the present invention provided a liquid crystal display device including a liquid crystal composition which comprises a chiral-nematic liquid crystal formed by mixing a chiral additive into a nematic liquid crystal and a two-tone pigment, and a reflection plate, wherein the composition satisfies a condition of $1.5<d/P_0<4$ and the step of the projection on the reflection plate satisfies a condition of $d_1<d_2/2$ thereby allowing a low voltage driving and providing a favorable display free from irregularities.

What is claimed is:

1. A liquid crystal display device which uses a phase transition type guest-host mode, the device comprising:

a pair of substrates with at least one substrate being a transparent substrate and having in the following order a transparent electrode and a first aligning film formed thereon, the other substrate located opposite to the transparent substrate with a liquid crystal composition disposed therebetween, said other substrate having in the following order an insulating film, a reflection plate, and a second aligning film formed thereon;

the reflection plate having projections at the surface thereof which is formed through the intermediary of the insulating film having projections at the surface thereof on the substrate;

the aligning films being subjected to a vertical aligning treatment relative to the respective substrates; and the liquid crystal composition comprising a nematic liquid crystal, a chiral additive and a two-tone pigment;

wherein a helical pitch ($P_o$) of the liquid crystal composition and the cell thickness (d) of the liquid crystal display device satisfy the relation of $1.5<d/P_o<4$;

wherein a height ($d_1$) of a projection of the reflection plate and a depth ($d_s$) of the surface layer formed by adding the thickness of the two aligning films on the pair of the substrates subjected to the aligning treatment satisfy the condition of $d_1<d_s/2$.

2. A liquid crystal display device of claim 1 wherein the helical pitch($P_0$) is in the range of 0.25 to 13.33 μm.

3. A liquid crystal display device of claim 1 wherein the cell thickness(d) is in the range of 1.0 to 20.0 μm.

4. A liquid crystal display device of claim 1 wherein the height($d_1$) of the projection is in the range of 0.05 to 3.0 μm.

5. A liquid crystal display device of claim 1 wherein the depth($d_s$) of the surface layer is in the range of 0.1 to 5.33 μm.

6. The liquid crystal display device of claim 1, which is an active matrix type liquid crystal display device having a switching device between the other substrate and the insulating film.

7. The liquid crystal display device of claim 1, wherein an electrode is further formed between the other substrate and the insulating film.

* * * * *